United States Patent [19]
Goto et al.

[11] Patent Number: 5,756,955
[45] Date of Patent: May 26, 1998

[54] METHOD AND APPARATUS FOR ELECTRIC DISCHARGE MACHINING WITH CALCULATION OF MACHINING AREA

[75] Inventors: Akihiro Goto; Takuji Magara; Masahiro Yamamoto, all of Tokyo, Japan

[73] Assignee: Mitsubishi Denki Kabushiki Kaisha, Tokyo, Japan

[21] Appl. No.: 643,960

[22] Filed: May 7, 1996

[30] Foreign Application Priority Data

Jul. 31, 1995 [JP] Japan ............... 7-194517

[51] Int. Cl.$^6$ .................................................. B23H 1/02
[52] U.S. Cl. .................................................... 219/69.13
[58] Field of Search .......................... 219/69.13, 69.16, 219/69.19, 69.17

[56] References Cited

U.S. PATENT DOCUMENTS

| | | | |
|---|---|---|---|
| 4,321,451 | 3/1982 | Inoue | 219/69.13 |
| 4,521,660 | 6/1985 | Inoue | 219/69.18 |
| 4,760,233 | 7/1988 | Obara | 219/69.16 |
| 5,408,064 | 4/1995 | Takahara | 219/69.13 |
| 5,571,426 | 11/1996 | Akemura | 219/69.13 |

FOREIGN PATENT DOCUMENTS

| | | |
|---|---|---|
| 51-35273 | 10/1976 | Japan . |
| 57-50616 | 10/1982 | Japan . |
| 58-211827 | 12/1983 | Japan . |
| 59-7523 | 1/1984 | Japan . |
| 61-146420 | 7/1986 | Japan . |
| 379230 | 4/1991 | Japan . |
| 3270821 | 12/1991 | Japan . |
| 523917 | 2/1993 | Japan . |
| 5-200626 | 8/1993 | Japan . |

OTHER PUBLICATIONS

T. Sato, et al, "Determination of Electric Discharge State According to Electric Discharge Pulse Waveform", Paper presented at the 2nd meeting of the Electric Machining Society, Tokyo, (1992).

*Primary Examiner*—Geoffrey S. Evans
*Attorney, Agent, or Firm*—Sughrue, Mion, Zinn, Macpeak & Seas, PLLC

[57] ABSTRACT

An electric discharge machine includes a pulse determining section, which determines whether an electric discharge pulse is an effective electric discharge pulse contributing to machining or an ineffective pulse not contributing to machining, a pulse counting section, which counts the number of electric discharge pulses determined to be effective electric discharge pulses, a machining speed measuring section, which measures the machining rate in the axial direction, a dividing section, which divides the total number of electric discharge pulses by the machining rate in the axial direction, a storage section, which stores predetermined constant data corresponding to electric conditions such as a waveform for a current due to materials of an electrode and a workpiece or generation of electric discharge, and a machined area computing section, which computes a machined area according to the divided data and the stored constant data. A method for controlling the electric discharge machine is also described.

19 Claims, 11 Drawing Sheets

FIG. 6A

☐ CASE OF 5mm

| PULSE WIDTH | CURRENT VALUE WHEN GENERATING PROJECTION | CURRENT DENSITY |
|---|---|---|
| 128 μs | 7A | 28 A/cm² |
| 256 μs | 4A | 16 A/cm² |
| 512 μs | 2A | 8 A/cm² |
| 1024 μs | 1A | 4 A/cm² |

FIG. 6B

☐ CASE OF 10mm

| PULSE WIDTH | CURRENT VALUE WHEN GENERATING PROJECTION | CURRENT DENSITY |
|---|---|---|
| 128 μs | 28A | 28 A/cm² |
| 256 μs | 16A | 16 A/cm² |
| 512 μs | 8A | 8 A/cm² |
| 1024 μs | 4A | 4 A/cm² |

| MACHINED AREA | ~3mm SQUARE | ~6mm SQUARE | ~10mm SQUARE | ~15mm SQUARE |
|---|---|---|---|---|
| PEAK CURRENT (A) | 3 | 5 | 8 | 10 |
| PULSE WIDTH($\mu$s) | 35 | 65 | 90 | 130 |
| QUIESCENT PERIOD OF TIME ($\mu$s) | 35 | 65 | 90 | 130 |

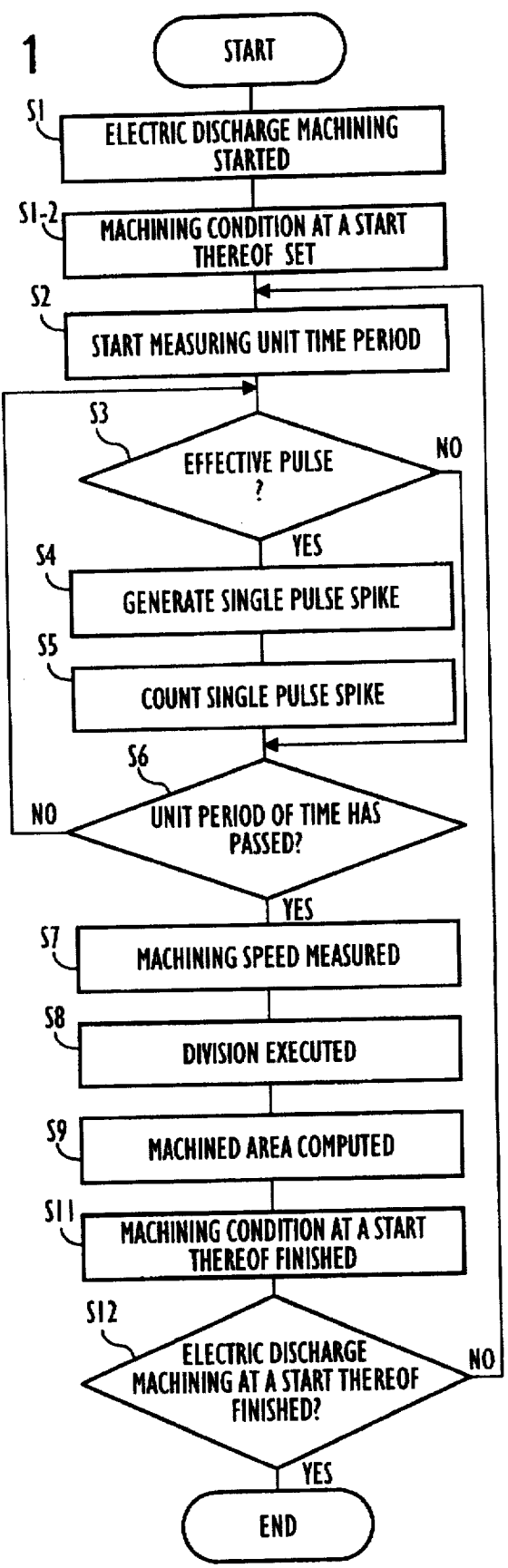

F I G. 1 2

| MACHINED AREA | Ip:25A, PULSE WIDTH:500μs | Ip:25A, PULSE WIDTH:500μs | Ip:10A, PULSE WIDTH:130μs |
|---|---|---|---|
| 25mm² ~ | QUIESCENCE : 4000μs | QUIESCENCE : 1000μs | QUIESCENCE : 500μs |
| 50mm² ~ | QUIESCENCE : 1000μs | QUIESCENCE : 500μs | QUIESCENCE : 100μs |
| 100mm² ~ | QUIESCENCE : 500μs | QUIESCENCE : 100μs | QUIESCENCE : 50μs |
| 200mm² ~ | QUIESCENCE : 100μs | QUIESCENCE : 50μs | QUIESCENCE : 20μs |
| 400mm² ~ | QUIESCENCE : 50μs | QUIESCENCE : 20μs | QUIESCENCE : 10μs |
| 500mm² ~ | QUIESCENCE : 20μs | QUIESCENCE : 20μs | QUIESCENCE : 10μs |

METHOD AND APPARATUS FOR ELECTRIC DISCHARGE MACHINING WITH CALCULATION OF MACHINING AREA

FIELD OF THE INVENTION

The present invention relates to an electric discharge machine and an electric discharge machining method, in which machining is performed on a workpiece by generating an electric discharge between an electrode and the workpiece, and more particularly to an electric discharge machine and an electric discharge machining method in which an accurate machine area can be obtained by computing the machined area during electric discharge machining.

BACKGROUND OF THE INVENTION

FIG. 12 is a view showing machining conditions employed in the conventional type of electric discharge machine for general diemilling. In this figure, appropriate machining conditions are set for each machined area. For this reason, in a case where an operator executes machining in which a machined area varies with respect to each machined area, the operator prepares a complicated program in which machining conditions are changed according to change in depth between the machined area, and then performs the desired diemilling on the workpiece.

In relation to what was described above, as the conventional type of electric discharge machine, there is, for instance, the "electrically energyzing machining apparatus" as disclosed in Japanese Patent Publication No.35273/1976. In this machine, a value corresponding to a machined area is recognized, and machining conditions are automatically set to optimal values.

Also as another electric discharge machine based on the conventional technology, there is, for instance, the "wire cut electric discharge machine" disclosed in Japanese Patent Laid-Open Publication No.7523/1984. In this machine, a thickness of a work is detected from a machining current value and a machining speed, and machining conditions are changed according to a result of the detection.

However, in the "electrically energyzing machining apparatus" based on the conventional technology described above, the waveform applied in electric discharge is not constant, so that, although a value basically corresponding to a machined area can be obtained, the precision is rather low. Furthermore although substantial increase or decrease in area can be recognized to a certain degree, an absolute value for a machined area can not be obtained.

Also in the "wire cut electric discharge machine" based on the conventional technology as described above, machining rate is computed by using an actual machining current value. In electric discharge machining, even if an average current is kept constant, when a waveform of the current changes widely, the machining efficiency varies remarkably, and such factors as a peak current value or a pulse width of an electric discharge pulse substantially change, so that determination of a machined area sometimes becomes difficult for certain machining current values.

SUMMARY OF THE INVENTION

It is an object of the present invention to provide an electric discharge machine and an electric discharge machining method in which machining efficiency as well as machining performance in electric discharge machining can be improved by accurately computing a machined area depending on the fact that, in a case where a current waveform of an electric discharge pulse is kept constant, a machining rate for a work is substantially equal to a product of a machining/removal rate by one electric discharge pulse contributing to machining by a number of effective electric discharge pulses each contributing machining and further more that a machining/removal rate by one electric discharge pulse is decided by a current waveform and by executing electric discharge machining in suitable machining condition according to the computed machined area.

With the present invention, a pulse determining section determines whether an electric discharge pulse is an effective electric discharge pulse contributing to machining or an ineffective pulse not contributing to machining, a pulse counting section counts a number of electric discharge pulses determined as an effective electric discharge pulse, a machining speed measuring section measures a rate of machining in the axial direction, a dividing section divides a number of electric discharge pulses by a rate of machining in the axial direction, a storage section stores constant data preset according to electric conditions such as a waveform for a current due to materials of an electrode and a workpiece or generation of electric discharge, and a machined area computing section computes a machined area according to the divided data and the stored constant data.

Other objects and features of this invention will become apparent from the following description with reference to the accompanying drawings.

BRIEF DESCRIPTION OF DRAWINGS

FIG. 6 is an explanatory view showing a relation between generation of icicle and a machining condition;

FIG. 11 is a flow chart showing a sequence of electric discharge machining in the electric discharge machine according to Embodiment 4; and FIG. 12 is an explanatory view showing machining conditions used in a conventional type of an electric discharge machine for normal engraving.

DESCRIPTION OF THE PREFERRED EMBODIMENTS

Figure 1:
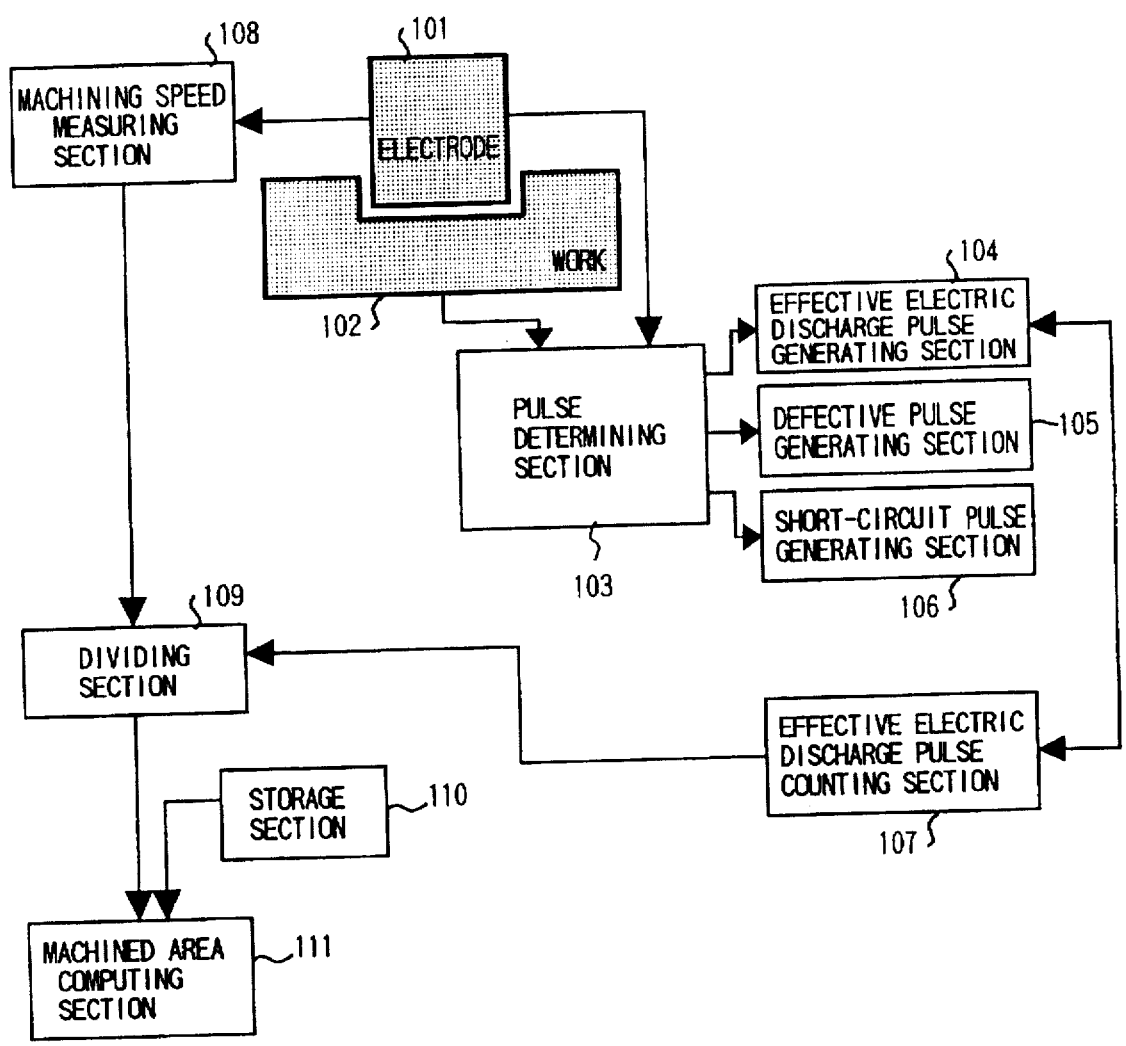
FIG. 1 is a block diagram showing a schematic configuration of Embodiment 1 of an electric discharge machine according to the present invention.

A description is made hereinafter for embodiments of an electric discharge machine according to the present invention with reference to the related drawings. FIG. 1 is a block diagram showing an exemplary schematic configuration of the electric discharge machine according to Embodiment 1 of the present invention.

In FIG. 1, designated at the reference numeral 101 is an electrode, at 102 a workpiece to which an electric discharge machining is executed by the electrode 101, and at 103 a pulse determining section for determining whether an electric discharge pulse generated during execution of electric discharge from the electrode 101 to the workpiece 102 is an effective electric discharge pulse contributing to machining of the workpiece 102 or an ineffective pulse not contributing to machining of the workpiece 102.

Also in the figure, designated at the reference numeral 104 is an effective electric discharge pulse generating section for generating a single strike of pulse spike in response to an effective electric discharge pulse when an electric discharge pulse determined to be an effective electric discharge by the pulse determining section 103 is generated, at 105 a defective pulse generating section for generating a single pulse spike when an electric discharge pulse determined to be a defective pulse by the pulse determining section 103 is generated, and at 106 a short-circuit pulse generating section for generating a single pulse spike when an electric discharge pulse determined to be a short-circuit pulse by the pulse determining section 103 is generated.

Also in the figure, designated at the reference numeral 107 is an effective electric discharge pulse counting section for counting a number of pulses per unit period of time, e.g., 10 second, generated in the effective electric discharge generating section 104, at 108 a machining speed measuring section for measuring a rate of machining in the axial direction per unit period of time, and at 109 a dividing section for dividing a number of pulses of an effective electric charge pulse per unit period of time counted by the effective electric charge pulse counting section 107 by a rate of machining in the axial direction per unit period of time measured by the machining speed measuring section 108.

Also in the figure, designated at the reference numeral 110 is a storage section for storing at least one or more values determined by electric conditions according to the waveform of discharge current or a material for an electrode and a material for a workpiece, and at 111 a machined area computing section for computing a machined area by using an output result output from the dividing section 109 and a value or values stored in the storage section 110.

Next, a description is made for principles of computing a machined area, as an example, in a case where machining is executed in the Z-axial direction, namely in the vertical direction. At first, assuming that a rate for removing the workpiece 102 by a single spike of electric discharge under prespecified machining conditions is kept constant, a value corresponding to the machined area is computed from a rate of machining and a rate of machining thereof in the Z-axial direction per unit period of time.

Assuming that a volume of material removed from the workpiece 102 by a single spike of electric discharge is set to v, a rate of machining the workpiece per unit period of time is set to V, a rate of machining in the Z-axial direction per unit period of time is set to 1 (L), a number of effective electric discharge pulses per unit period of time is set to n, and a machined area is set to S. A rate of machining a work piece V can be obtained by a product of a volume v of the material removed from the work piece 102 by a single electric discharge spike and a number of pulses of an effective electric discharge n per unit period of time, or a machined area S and a rate of machining 1 in the Z-axial direction per unit period of time.

Namely, a rate of machining the workpiece can be obtained by expression the following:

$$V = v \cdot n = S \cdot 1 \tag{1}$$

With the expression (1) described above, a machined area S can be obtained by dividing the product of a volume v of the material removed from the workpiece 102 with a single electric discharge spike and a number of pulses n of an effective electric discharge per unit period of time by a rate 1 of machining in the Z-axial direction per unit period of time.

Namely, an expression for obtaining a machined area is as follows:

$$S = v \cdot n / 1 \tag{2}$$

In a case where a waveform of a current pulse is kept constant, a volume v of the material removed from the workpiece with a single electric discharge spike becomes a constant. For this reason, with the expression (2) described above, a machined area S can be computed by measuring a number of effective electric discharge pulses n per unit period of time and a rate of machining 1 in the Z-axial direction per unit period of time. Also the expression (1) described above can be alternatively expressed as follows. Namely, $$n/1 = S/v = c \cdot S \tag{3}$$

Herein c indicates a constant.

From the expression (3) described above, it will be appreciated that n1 is proportionate to the machined area S. Accordingly, a value for n/1 can be computed for each machining condition, and a machined area S can be computed once the constant c is obtained.

As described above, the dividing section 109 computes the value for n1 described above, and the machined area computing section 111 computes a machined area S by using an output result output from the dividing section 109 and the constant c, described above, stored in the storage section 110.

Figure 2:
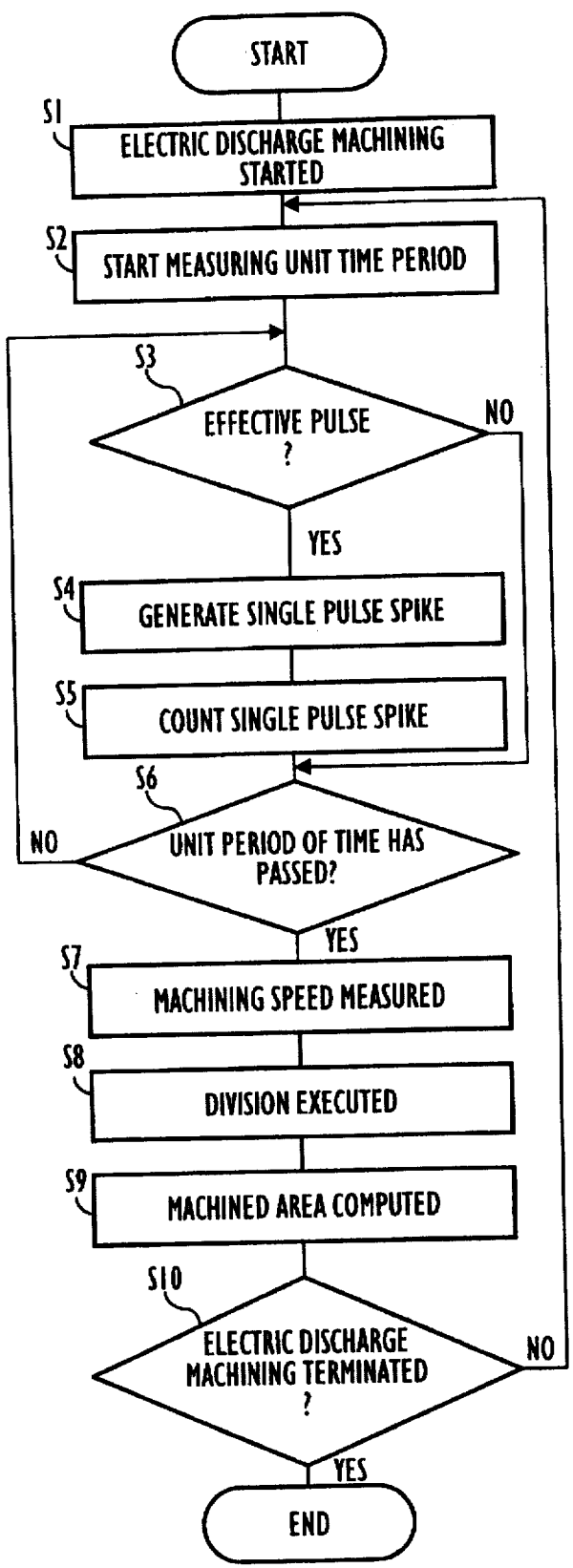
FIG. 2 is a flow chart showing a sequence of electric discharge machining in the electric discharge machine according to Embodiment 1.

Next, a description is made for operations in accordance with Embodiment 1. FIG. 2 is a flow chart showing a sequence of electric discharge machining in the electric discharge machine according to Embodiment 1. In the flow chart, the electric discharge machine starts electric discharge machining (S1), and starts measuring a time of preset unit period of time (S2). Herein, an adequate interval between an electrode 101 and a workpiece 102 is maintained, like in general electric discharge machining, by adjusting coordinate values in the X-axis, Y-axis, and Z-axis (not shown herein) while electric discharge machining is executed.

In this step, the pulse determining section 103 determines whether an electric discharge pulse is an effective electric discharge pulse contributing to electric discharge machining, or an ineffective pulse not contributing to electric discharge machining (S3). Herein, an ineffective pulse not contributing to electric discharge machining indicates a pulse which is not effective in machining, such as a pulse when an arc is generated, or a harmful pulse, other than a defective pulse and a short-circuit pulse or the like.

In the step S3, in a case where it is determined that the discharged pulse is an effective electric discharge pulse, the effective electric discharge generating section 104 generates a single of pulse spike in response to the effective electric discharge pulse described above (S4).

Then the single pulse spike generated in the effective electric discharge generating section 104 in the step S4 is counted as a pulse corresponding to an effective electric discharge pulse by the effective electric discharge pulse counting section 107 (S5).

In the step S3, in a case where it is determined that the discharged pulse is not an effective electric discharge, system control skips each step in step S4 as well as step S5, and shifts to a processing in step S6.

Then determination is made as to whether a specified unit period of time has elapsed or not after starting measurement of a time for a unit period of time (S6). In the step S6, in a case where it is determined that the unit period of time has not elapsed, system control returns to the step S3, and repeatedly executes each step from step S3 to step S6. As a result of that, a number of single pulse spikes counted by the effective electric discharge pulse counting section 107 is output to the dividing section 109 in the step S5.

In the step S6, in a case where it is determined that the unit period of time has elapsed, a machining speed in the machining direction, namely a feed speed for an electrode 101, is measured by the machining speed measuring section 108 (S7). Operations for the processing in this step may be executed concurrently with an operation for counting the number of effective electric discharge pulses (Step S2 to Step S6).

As a method of measuring a machining speed, it is recommended that a device for recording a value for the deepest position of machining, namely a position where the machining proceeds the most, is provided and a machining speed is obtained from the value. Generally, control is provided so that a distance between an electrode and a workpiece is kept constant during the electric discharge machining. However, there is sometimes a case where, for instance, a distance between electrodes becomes fleetingly large, like immediately after a short-circuit.

If a machining speed is measured at the point of time described above, a case where an accurate value can not be measured is generated. And for this reason, a more accurate value can be measured by recording a position where a machining processing proceeds the most and by measuring a machining speed according to the value.

Then, in the dividing section 109, the effective electric discharge pulse per unit period of time obtained in the step S5 is divided by a result of measurement of the machining speed obtained in the step S7 (S8). After the step, a machined area is computed from the result of division in step S8 and the constant c stored in the storage device 110 by the machined area computing section 111 (S9). The computing of a machined area is executed according to "the principles for computing a machined areas" as described above.

Determination is then made as to whether the electric discharge machining has been finished or not (S10). In the step S10, in a case where it is determined that the electric discharge machining has not been finished, system control returns to the beginning of step S2, and each operation in each step from step S2 to step S10 is executed repeatedly, with the machined area S being computed each time. On the contrary, in the step S10, if it is determined that the electric discharge machining has been finished, the operation for computing a machined area is also terminated.

In Embodiment 1, a machined area can be accurately computed regardless of a waveform of a current so long as a machining condition is employed wherein the waveform of a current is kept constant. For instance, accurate computation of a machined area can be executed under a condition of a current waveform having a slope in the first transition of a current, enabling remarkable reduction of consuming an electrode, or under a condition of a waveform having a triangle shape with a high current peak and a short pulse width, enabling high speed machining of a material which is hard to machine.

Figure 3:
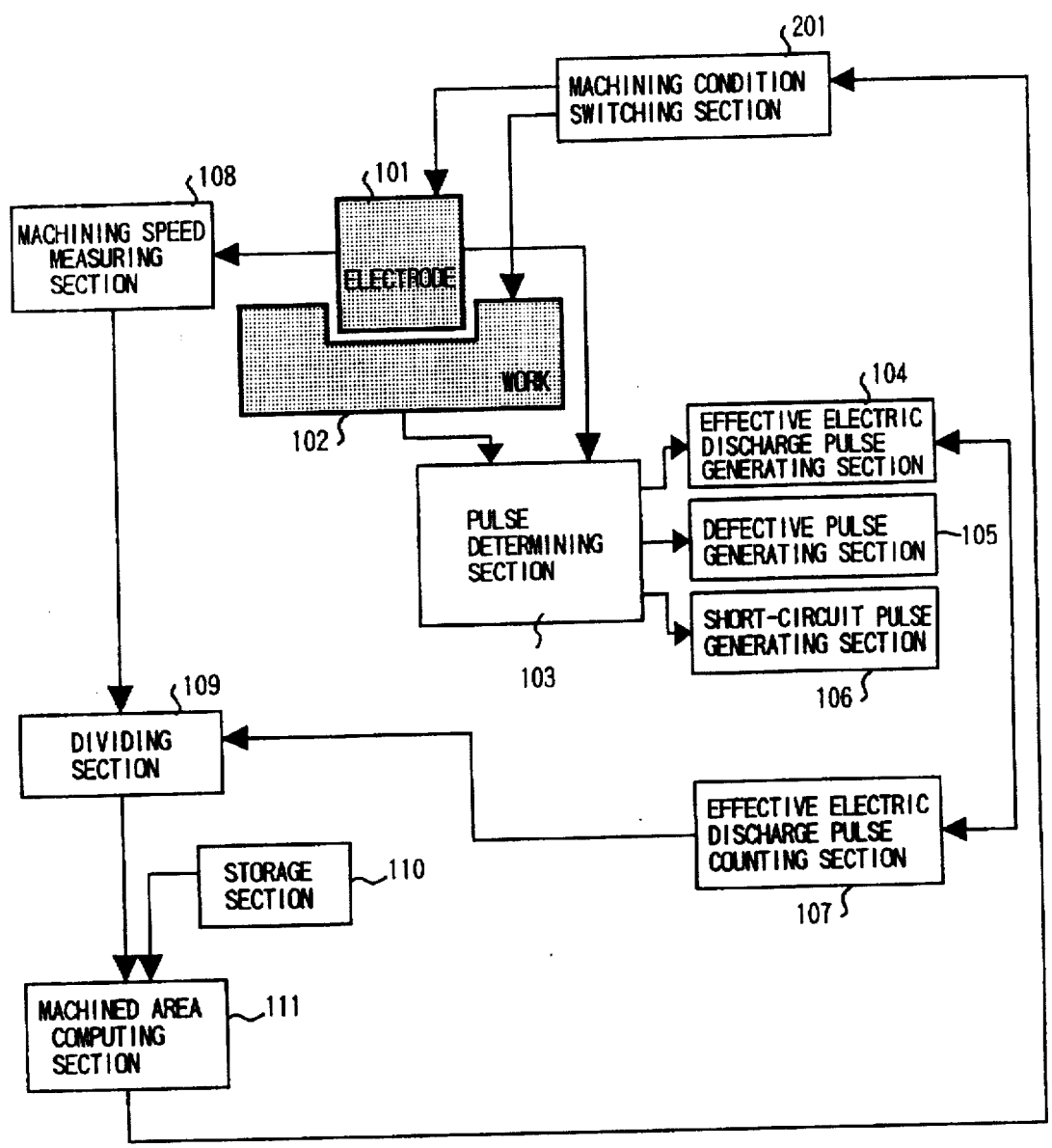
FIG. 3 is a block diagram showing a schematic configuration of an electric discharge machine according to Embodiment 2.

FIG. 3 is a block diagram showing a schematic configuration of an electric discharge machine according to Embodiment 2 of the present invention. In the figure, the same reference numerals are assigned to the same portions in the configuration as those in the electric discharge machine according to Embodiment 1, and description thereof is omitted herein.

In FIG. 3, the reference numeral 201 is a machining condition switching section for switching machining conditions for electric discharge machining in response to a result of measurement of a machined area S computed by the machined area computing section 111.

Next, a description is made for configuration and operations of the machining condition switching section 201. In general electric discharge machining, machining conditions optimal to electric discharge machining vary according to a machined area. Also even if machining conditions such as a current pulse of a peak current and a pulse width are identical, machining conditions optimal to electric discharge machining such as a condition for stopping operations or a condition of an operation for jumping are different from each other depending on the difference in each machined area.

Generally, in a case where a machined area is changed during execution of an electric discharge machining, a current for machining is changed so that the current is substantially proportionate to the machined area. This operation is executed so that the current for machining per unit period of time is kept constant. In this case, when a current waveform characteristic such as peak current and pulse width is changed, surface roughness or consumption of electrode is changed, so that a current for machining is changed for a quiescent period of time.

As inconveniences in a case where a machining condition suited for an area is not selected, an abnormal electric discharge called an arc is generated when machining is executed under the machining conditions for a large machined area in spite of a case where a condition for a small machined area is required and, on the contrary, a machining speed becomes slower when machining is executed under a condition for a small machined area in a case where a machined area is large.

Accordingly, conditions suited for a machined area should be selected for existing machining conditions. As described above, the machining condition switching section 201 selects some condition optimal for electric discharge machining in response to a machined area changed from moment to moment during electric discharge machining, and switches the machining condition to any of other one.

Figure 4:
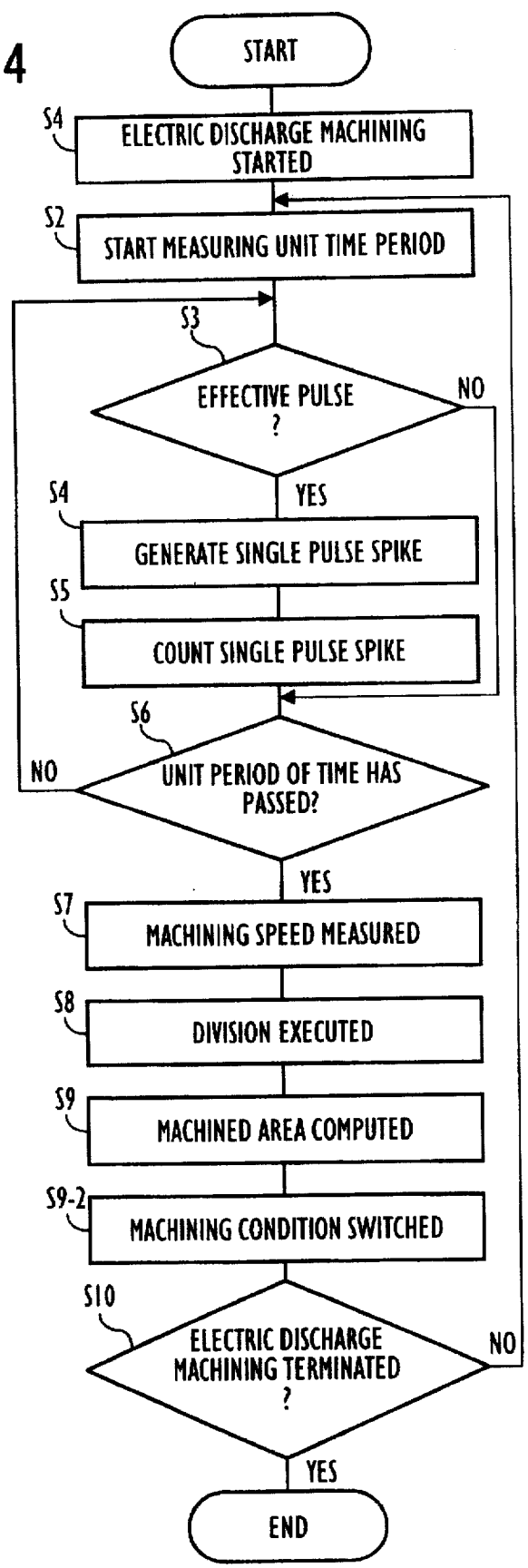
FIG. 4 is a flow chart showing a sequence of electric discharge machining in the electric discharge machine according to Embodiment 2.

Next, a description is made for operations thereof. FIG. 4 is a flow chart showing a sequence of operation for switching machining conditions in an electric discharge machine according to Embodiment 2. In the flow chart, each operation in step S1 to step S9 and step S10 is the same as that in each step in FIG. 2 described above, so that description thereof is omitted herein.

The machining condition switching section 201 switches machining conditions initially set or currently set to some machining condition suited to the computed machined area according to a value for the machined area computed by the machined area computing section 111 (S9-2).

Determination is made as to whether the electric discharge machining has been finished or not in step S10 after switching the machining condition in the step S9-2 (10). In the step 10, in a case where it is determined that the electric discharge machining has not been finished, system control returns beginning of step S2, and each operation in each step from step S2 to step S10 is executed repeatedly, then a machined area is computed for each time, and a machining condition is switched corresponding to a result of the computation. On the other hand in the step S10, in a case where it is determined that the electric discharge machining has been finished, an operation for computing a machined area and switching machining conditions is finished.

With Embodiment 2, electric discharge machining is executed in a state where a machining condition is switched to any suitable machining condition by using an accurately computed value for a machined area, so that more effective, and stable electric discharge machining can be executed and, furthermore, an abnormal electric discharge, which is detrimental generated during electric discharge machining can be prevented.

Figure 5:
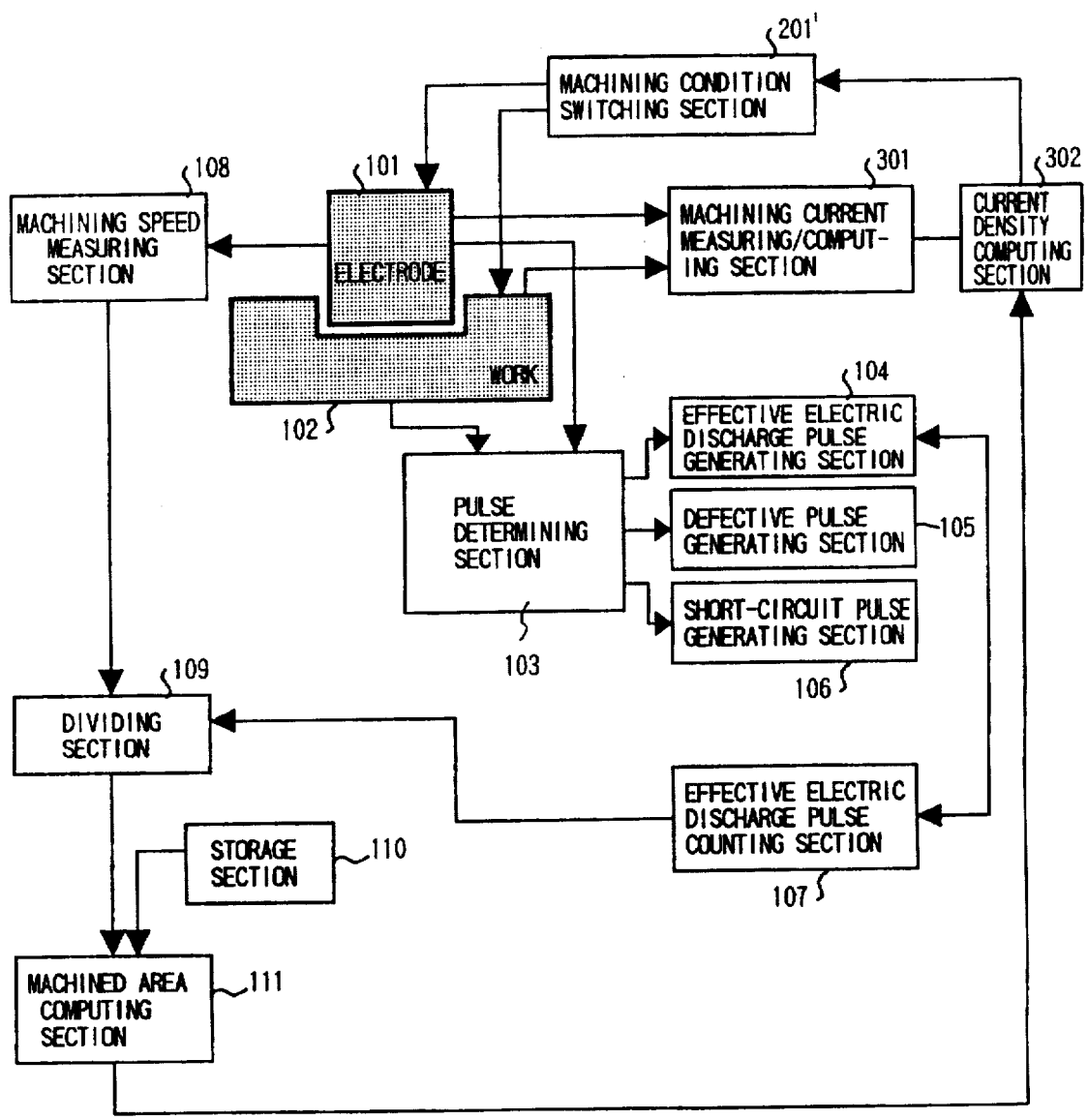
FIG. 5 is a block diagram showing a schematic configuration of an electric discharge machine according to Embodiment 3.

FIG. 5 is a block diagram showing a schematic configuration of an electric discharge machine according to Embodiment 3. In the figure, the same reference numerals are assigned to the same portions in configuration as those in the electric discharge machine according to Embodiment 1 shown in FIG. 1 or as those therein according to Embodiment 2 shown in FIG. 3, and description thereof is omitted herein.

In FIG. 5, designated at the reference numeral 301 is a machining current measuring/computing section for measuring a current for machining during electric discharge machining, at 302 a current density computing section for computing a current density according to the machined area computed by the machined area computing section 111 as well as a machining current measured by the machining current measuring/computing section 301. Also, the machining condition switching section 201, switches the machining condition for electric discharge machining in response to a current density computed by the current density computing section 302. Accordingly the machining condition switching section 201, also has a function of controlling a current for machining.

Next, a description is made for configuration and operations of the machining current measuring/computing section 301. The machining current measuring/computing section 301 is a section for measuring or computing a current value during electric discharge machining. A current for machining can directly be measured therein by using an amperemeter. Also, a number of electric discharge pulses can be counted, and the current for machining can also be computed from the counted number of pulses. Furthermore, a current for machining can also be measured by using a current value, which can be assumed from the machining condition. It should be noted that, in the method of using a current value assumable from the machining condition, there is sometimes a case where the precision of measurement thereof may be lower than that by any other method.

Next, a description is made for configuration and operations of the current density computing section 302. Generally, a current density gives a large effect to machining characteristics. If electric discharge machining is executed under a condition of high current density, abnormal electric discharge is easily generated. Especially, in a case where electric discharge machining is executed by a graphite electrode as a material of an electrode 101, there are generated some problems, such as a carbon-shaped projection, a so-called icicle, is generated on the electrode 101 when the current density becomes high and it becomes difficult to machine a workpiece 102 into a desired shape.

Generation of this icicle has a close relation with a current density. Namely, the wider a pulse width is, the more easily this icicle is generated. Also, the higher the current density is, the more easily the icicle is generated in a case where electric discharge machining is executed with the identical of a current waveform.

FIGS. 6A and 6B are views showing a relation between generation of an icicle and machining conditions (FIG. 6A is a case where an area of an electrode is 5×5 mm, FIG. 6B is a case where it is 10×10 mm). Generally, to keep constant the roughness of a machined surface of a workpiece 102 or the consumption of an electrode 101 in electric discharge machining, a peak current or a pulse width of pulse is made constant and then machining is executed, so that generation of an icicle can be prevented by controlling the current density. However, electric discharge machining under the condition of a low current density delays a machining speed of electric discharge machining.

As described above, generation of an icicle is prevented, then, to realize electric discharge machining with a high machining speed, a current density is computed in the current density computing section 302 by using a current value during electric discharge machining measured by the machining current measuring/computing section 301 and a machined area during electric discharge machining computed by the machined area computing section 111, and a result of computing the current density is outputted to the machining condition switching section 201,.

Figure 7:
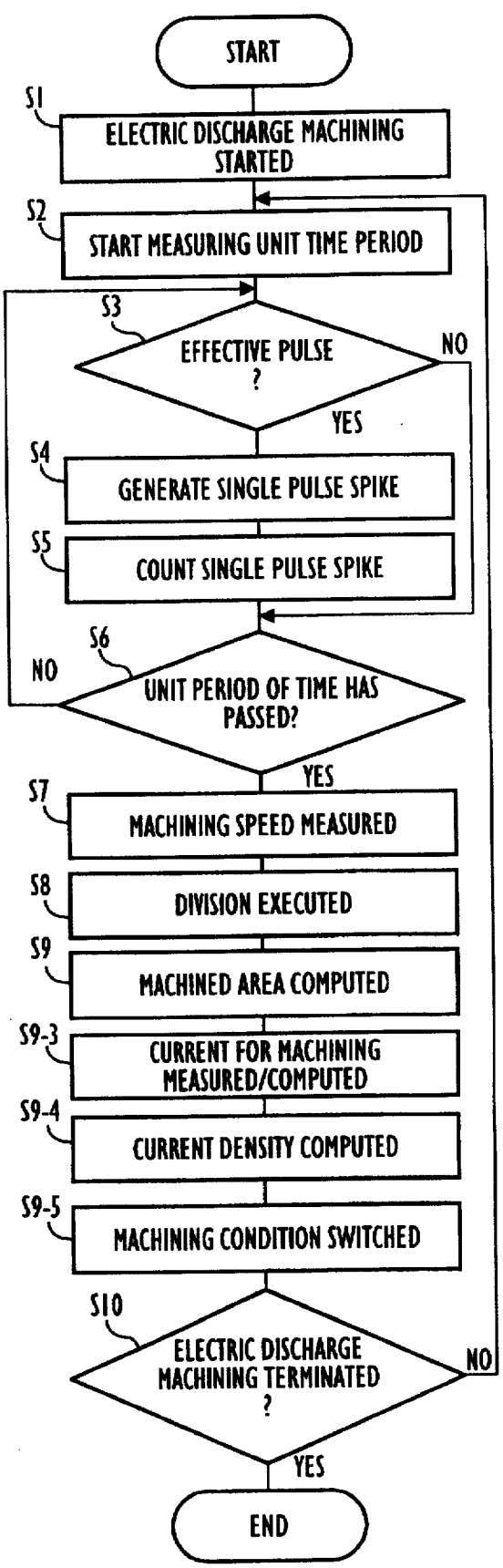
FIG. 7 is a flow chart showing a sequence of electric discharge machining in the electric discharge machine according to Embodiment 3.

Next, a description is made for operations. FIG. 7 is a flow chart showing a sequence of operation for switching machining conditions in an electric discharge machine according to Embodiment 3. In the flow chart, each processing operation in step S1 to step S9 and step S10 is the same as that in each step in the flow chart in FIG. 2 for Embodiment 1 described above, and description thereof is omitted herein.

After a machined area is computed by the machined area computing section 111 in the step S9, or concurrently with a sequential processing of computing a machined area in the machined area computing section 111, the machining current measuring/ computing section 301 measures or computes a current for machining during electric discharge machining (S9-3). The measured current value for machining is output to the current density computing section 302.

Then, the current density computing section 302 computes a current density by using the computed result of a machined area by the machined area computing section 111 in the step S9 and the measured current value for machining by the machining current measuring section 301 in the step S9-3 (S9-4). The computed current density is outputted to the machining condition switching section 303.

The machining condition switching section 201, determines a suitable machining condition according to the computed current density in the step S9-4, and switches the machining condition under which electric discharge machining is currently executed to the condition described above (S9-5). In this step, the machining condition switching section 201, provides a control to a current for machining so that a current for machining does not exceed a prespecified value, namely a current value for machining under which the icicle is not generated.

In the step S9-5, after switching of the machining condition is executed, a determination is made in the step S10 as to whether the electric discharge machining has been finished operation or not. In the step S10, in a case where it is determined that the electric discharge machining has not been finished, system control returns to the beginning of step S2, repeatedly executes operations in each step from step S2 to step S10, and a current density is computed for each time. Then the machining condition is switched in response to a result of the computation.

As described above, a machining condition is switched corresponding to a change of a current density. On the other hand, in the step S10, in a case where the electric discharge machining is finished, operations for computing a machined area and switching operation of machining conditions are finished.

With Embodiment 3, electric discharge machining is executed in a state where switching to a suitable machining condition is executed by using the accurately computed value for a current density, so that machining thereof can be effectively and stably executed under more suitable machining conditions, and furthermore, icicle disadvantageously generated during electric discharge machining can be prevented.

Figure 8:
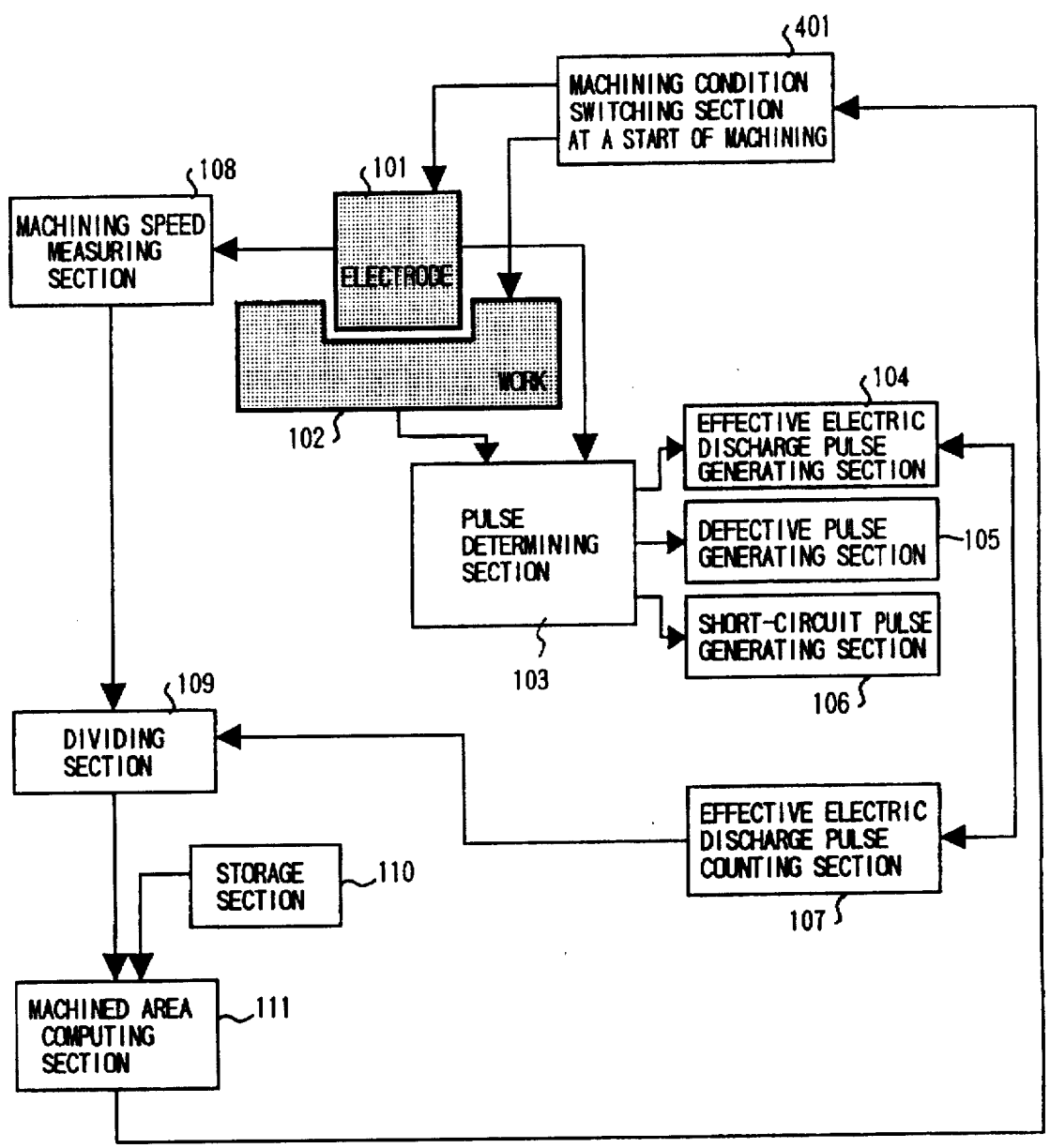
FIG. 8 is a block diagram showing a schematic configuration of an electric discharge machine according to Embodiment 4.

FIG. 8 is a block diagram showing a schematic configuration of an electric discharge machine according to Embodiment 4. In the figure, the same reference numerals are assigned to the same portions of the configuration as those in the electric discharge machine according to Embodiment 1 shown in FIG. 1, and description thereof is omitted herein.

In FIG. 8, the reference numeral 401 indicates a machining condition switching section for switching machining conditions for electric discharge machining, when machining is started, according to a result of the computed machined area S by the machined area computing section 111.

Next, a description is made for configuration and operations of the machining condition switching section at a start of machining 401. Generally, in electric discharge machining, a ratio of consumption of an electrode 101 is substantially decided according to a waveform of a current pulse, and the consumption ratio can be predicted. In a case where a machined area is extremely small, however, it is difficult for the area to be predicted, which causes the consumption of a workpiece 102 to increase.

Figures 9, 10:
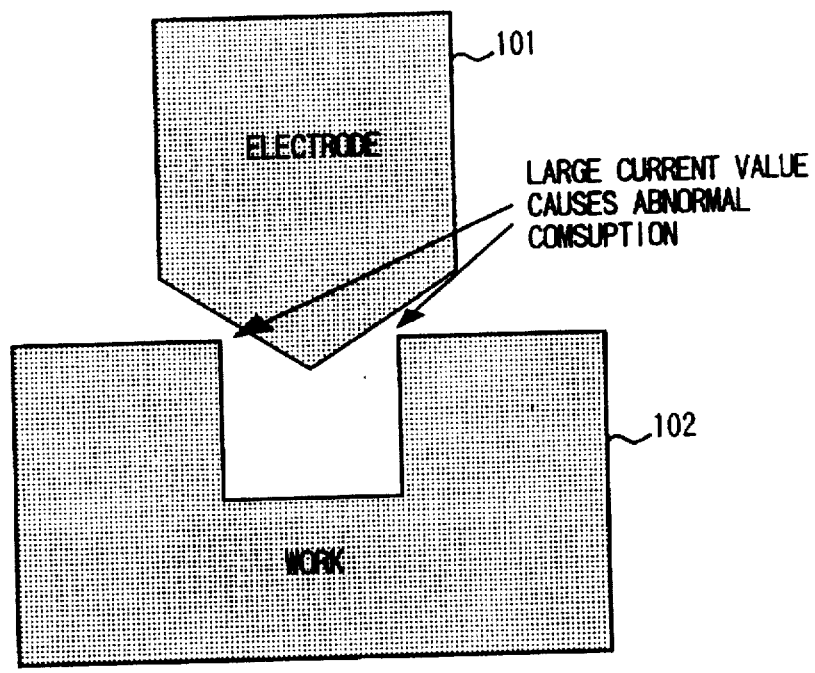
FIG. 9 is an enlarged cross-sectional view showing a relation between an electrode and a workpiece as a model thereof.
FIG. 10 is an explanatory view showing an example of switching a machining condition at starting of the machining.

FIG. 9 shows an example of a case where an electrode is abnormally easy to be consumed at a start of machining. In the figure, in a case where a workpiece 102 is subjected to premachining, and then machining is executed thereto with electric discharge machining, a machined area becomes extremely small at a start of machining.

As described above, a desired shape may be spoiled because a machined portion of the workpiece 102 is consumed at an abnormal quantity at a start of machining. In the case as described above, it is necessary to start electric discharge machining under the condition requiring only a small quantity of energy, and then to switch a machining condition so that a quantity of energy is made larger step by step in accordance with the increase of a machined area.

FIG. 10 is an explanatory view for explaining an example of switching a machining condition when the machining is started. In the figure, a peak current, a pulse width and a quiescent period of time optimal for each case where a machined area is "3 mm square or less", "6 mm square or less", "10 mm square or less", or "15 mm square or less" are shown as an example of switching a machining condition switching at a start of machining.

When a machined area is small, conditions for both a small peak voltage and a small pulse width are selected so that a large quantity of current for machining does not flow therein. Then a machining condition is switched so that a quantity of energy is made larger step by step in accordance with the increase of the machined area. For instance, in a case where a machined area is "3 mm square or less", a peak current is "3 A", and a pulse width is "35 µs".

Then in a case where a machined area is "6 mm square or less", or "10 mm square or less", it will be apparent that a peak current becomes "5 A" or "8 A" respectively, and a pulse width becomes "65 µs", or "90 µs", and the energy becomes larger step by step.

As described above, the initial machining condition switching section 401 sets conditions for starting machining, computes a machined area, and then switches the condition for starting machining according to the result thereof.

Next, a description is made for operations thereof. FIG. 11 is a flow chart showing a sequence of operations for switching machining conditions in an electric discharge machine according to Embodiment 4. In the flow chart, each processing operation in step S1 and step S2 to step S9 is the same as those in each step in the flow chart in FIG. 2 described above, and description thereof is omitted herein.

After starting electric discharge machining (S1), a machining condition at an initial start of the machining is set by the initial machining condition switching section 401 (S1-2). The machining condition at a start of the machining is previously set and registered. Then measurement of a time for a unit period of time is started (S2).

Then, after processing in each step as the steps S3 to S8 are executed, the initial machining condition switching section 401 switches the machining condition currently set to that at a start of the machining suited to the computed machined area according to the computed value of a machined area by the machined area computing section 111 in the step S9 (S11).

In the step S11, after switching of the machining condition at a start thereof, a determination is made as to whether electric discharge machining at a start thereof has been finished or not, namely whether a machined area has become larger than a specified value or more or not (S12).

In the step S12, in a case where the electric discharge machining at a start thereof has not been finished, system control returns to the beginning of step S2, and repeats operations in each step from step S2 to step S12.

On the other hand, in the step S12, in a case where it is determined that the electric discharge machining at a start thereof has been finished, the electric discharge machining at a start thereof is finished, and consequently, normal electric discharge machining, for instance, the electric discharge machining of electric discharge machine according to Embodiment 2 is executed. Namely, it is conceivable that a machining condition is switched from the machining condition at a start thereof according to the present embodiment to the normal machining condition.

With Embodiment 4, after initial conditions for starting electric discharge machining are set, electric discharge machining is executed in a state where the condition is switched to a suitable machining condition by using the computed value for the machined area, so that, even in a case where machining for a complicated shape is executed, electric discharge machining can effectively be executed without requiring a complicated program for obtaining machining conditions at a start thereof. Also, abnormal consumption of a workpiece 102 due to a mistake of the program at a start in machining is prevented. Advantageously electric discharge machining can be executed at a high speed.

Although the invention has been described with respect to several embodiment a for a complete and clear disclosure, the appended claims are not to be thus limited but are to be construed as embodying all modifications and alternative constructions that may occur to one skilled in the art which fairly fall within the basic teaching set forth herein.

What is claimed is:

1. An electric discharge machine which machines a workpiece by generating an electric discharge between an electrode and the workpiece and in which a current waveform for each electric discharge pulse during each machining condition can be set to a constant, comprising:

a pulse determining means for determining whether an electric discharge pulse is one of an effective electric discharge pulse contributing to machining and an ineffective pulse not contributing to machining;

a pulse counting means for counting a number of electric discharge pulses per unit time period determined to be said effective electric discharge pulse by said pulse determining means;

machining speed measuring means for measuring a rate per unit time period in the axial direction;

dividing means for dividing a said number of electric discharge pulses per unit time period counted by said pulse counting means by said machining rate per unit time period in the axial direction measured by said machining speed measuring means;

a storage means for storing data for predetermined constants representing materials for said electrode and said workpiece and characteristics of the current waveform; and machined area computing means for computing a machined area responsive to output data produced by said dividing means and at least one of said constants stored in said storage means.

2. The electric discharge machine according to claim 1, further comprising:

machining condition changing means for changing machining conditions so that the machined area computed by said machined area computing means is substantially proportional to a machining current value.

3. The electric discharge machine according to claim 1, further comprising:

machining current measuring means for measuring a machining current during machining; and current density computing means for computing a machining current density according to machining current data measured by said machining current measuring means and data corresponding to a machined area computed by said machined area computing means.

4. The electric discharge machine according to claim 3, further comprising:

machining current control means for controlling said machining current so that said current density computed by said current density computing means is kept at or below a predetermined value.

5. The electric discharge machine according to claim 1, further comprising:

machining current computing means for computing a machining current during machining; and current density computing means for computing a machining current density according to machining current data computed by said machining current computing means and data corresponding to a machined area computed by said machined area computing means.

6. The electric discharge machine according to claim 5, further comprising:

machining current control means for controlling said machining current so that said current density computed by said current density computing means is kept at or below a predetermined value.

7. The electric discharge machine according to claim 1, further comprising:

machining start condition setting means for setting machining start conditions requiring a small quantity of energy when machining is started; and machining start condition changing means for changing said machining start conditions responsive to said machined area computed by said machined area computing means during machining from said machining start conditions established by said machining start condition setting means.

8. The electric discharge machine according to claim 7, wherein said machining start condition varies one of peak current and pulse width.

9. An electric discharge machining method for executing machining to a workpiece by generating electric discharge between an electrode and a workpiece, said method comprising the steps of:

starting machining at predetermined machining start conditions;

determining whether an electric discharge pulse is an effective electric discharge pulse contributing to machining or an ineffective electric discharge pulse not contributing to machining;

counting electric discharge pulses per unit time period determined to be said effective electric discharge pulses to thereby generate a count value;

measuring machining rate per unit time period in the axial direction;

dividing said count value by said machining rate;

computing a machined area according to the output of said dividing step and at least one predetermined constant representing electrode material, workpiece material and electric discharge current waveform; and changing from said machining start conditions to machining conditions different from said machining start conditions based on said machined area.

10. The method as recited in claim 9, wherein said machining start condition varies one of peak current and pulse width.

11. The method as recited in claim 9, wherein said changing step further comprises:

measuring machining current;

computing current density responsive to said machining current and said machined area; and changing from said machining start conditions to machining conditions different from said machining start conditions responsive to said current density.

12. The method as recited in claim 9, wherein said changing step further comprises:

computing machining current;

computing current density responsive to said machining current and said machined area; and changing from said machining start conditions to machining conditions different from said machining start conditions responsive to said current density.

13. The method as recited in claim 9, wherein:

said starting step comprises starting machining at predetermined machining start conditions requiring a small quantity of energy; and said changing step comprises changing from said machining start conditions to machining conditions different from said machining start conditions responsive to increases in said machined area.

14. An electric discharge machine which machines a workpiece by generating an electric discharge between an electrode and the workpiece and in which a current waveform for each electric discharge pulse produced during each machining condition is constant, comprising:

a first circuit which discriminates effective electric discharge pulses contributing to machining from ineffective pulses not contributing to machining;

a counter operatively connected to said first circuit which generates a count value of said effective electric discharge pulses per unit time period;

a second circuit coupled to the electrode which measures machining rate per unit time period in the axial direction;

a dividing circuit operatively connected to said counter and said second circuit which divides said count value by said machining rate per unit time period in the axial direction to thereby generate output data; and a computer receiving said output data and selected ones of predetermined constants representing electrode materials, workpiece materials and current waveform characteristics which computes a machined area value.

15. The electric discharge machine according to claim 14, further comprising:

a controller receiving said machined area value which establishes machining conditions so that said machined area value is substantially proportional to a machining current value.

16. The electric discharge machine according to claim 14, further comprising:

a fourth circuit operatively connected to the electrode and the workpiece which measures a machining current during machining;

a current density computer operatively connected to said fourth circuit which computes a machining current density according to said machining current and said machined area value; and a current controller which controls a machining current so that said current density is kept at or below a predetermined value.

17. The electric discharge machine according to claim 14, further comprising:

a second computer operatively connected to the electrode and the workpiece which computes a machining current during machining;

a third computer operatively connected to said second computer which computes a machining current density according to said machining current and said machined area value; and a current controller which controls a machining current so that said current density is kept at or below a predetermined value.

18. The electric discharge machine according to claim 14, further comprising:

a fourth circuit which sets machining start conditions requiring a small quantity of energy when machining is started; and a firth circuit which establishes machining conditions different from said machining start conditions responsive to said machined area value.

19. The electric discharge machine according to claim 18, wherein said machining start condition varies one of peak current and pulse width.

* * * * *